(12) United States Patent
Highsmith

(10) Patent No.: US 6,733,558 B2
(45) Date of Patent: May 11, 2004

(54) BENEFICIATED SLUDGE

(75) Inventor: Ronald Earl Highsmith, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 67 days.

(21) Appl. No.: 09/855,480

(22) Filed: May 15, 2001

(65) Prior Publication Data

US 2002/0088749 A1 Jul. 11, 2002

Related U.S. Application Data (60) Provisional application No. 60/246,686, filed on Nov. 7, 2000.

(51) Int. Cl.$^7$ .................................................. C05F 3/00
(52) U.S. Cl. ............................................................ 71/12
(58) Field of Search ........................................ 71/6–12

(56) References Cited

U.S. PATENT DOCUMENTS

| | | | |
|---|---|---|---|
| 3,619,420 A | 11/1971 | Kemmer ........................ 210/6 |
| 3,655,395 A | 4/1972 | Karnemaat ..................... 99/2 R |
| 3,853,616 A | * 12/1974 | Rundell et al. ................ 127/48 |
| 3,939,280 A | 2/1976 | Karnemaat ....................... 426/2 |
| 3,942,970 A | 3/1976 | O'Donnell ....................... 71/12 |
| 4,038,181 A | 7/1977 | Talbert ......................... 210/633 |
| 4,304,588 A | 12/1981 | Moore, Jr. ....................... 71/28 |
| 4,519,831 A | 5/1985 | Moore ............................ 71/13 |
| 4,925,571 A | * 5/1990 | Jacob et al. ................. 210/742 |
| 4,956,926 A | 9/1990 | Glorioso ........................ 34/378 |
| 5,275,733 A | 1/1994 | Burnham ..................... 210/609 |
| 6,368,511 B1 | * 4/2002 | Weissenberg et al. ...... 210/759 |
| 6,444,124 B1 | * 9/2002 | Onyeche et al. ............ 210/202 |

FOREIGN PATENT DOCUMENTS

| | | | |
|---|---|---|---|
| EP | 0 143 392 B1 | 3/1989 | ........... C02F/11/14 |
| FR | 2757504 A1 | 12/1996 | ........... C05G/1/00 |
| JP | 58032638 | 7/1983 | ........... C02F/11/12 |
| JP | 9110570 A2 | 4/1997 | ........... C05F/17/00 |

OTHER PUBLICATIONS

S. Honda et al., "Granulation of Compost From Sewage Sludge. V. Reduction of Ammonia Emission From Drying Process", *Hokkaidoritsu Kogyo Shikenjo Hokoku*, 287, 85–89(1988).

* cited by examiner

*Primary Examiner*—Chester T. Barry
(74) *Attorney, Agent, or Firm*—Margaret S. Millikin; Virginia Szigeti (57) ABSTRACT

A beneficiated sludge solids composition comprising digested municipal sewage sludge, ammonium sulfate, and superphosphoric acid. Alternatively, a beneficiated sludge solids composition comprising digested municipal sewage sludge, ammonium sulfate, mineral acid and phosphate salt. The constituents of the beneficiated sludge solids composition of the invention act synergistically to increase economic value through increased fertilization values of nitrogen and phosphorous, decreased flammability and autocombustibility, decreased ammonia evolution on drying and decreased corrosibility. The beneficiated sludge solids composition is capable of being produced in present sewage treatment facilities.

19 Claims, 3 Drawing Sheets

Prior Art

BENEFICIATED SLUDGE

CROSS-REFERENCES TO RELATED APPLICATIONS

This application claims the benefit of provisional application Ser. No. 60/246,686 filed Nov. 7, 2000.

BACKGROUND OF THE INVENTION

1. Field of the Invention

The present invention relates to sludge solids beneficiated for use as fertilizer, and possessing improved resistance to combustion and corrosive effect. The invention also includes methods for its production.

2. Description of the Related Art

The disposal of sludges discharged from large-scale wastewater treatment plants is a serious and growing problem. In 1990, the United States Environmental Protection Agency indicated that a family of four discharged 300 to 400 gallons of wastewater per day. From this wastewater, publicly owned treatment works generated approximately 7.7 million dry metric tons of sludge annually or about 64 dry pounds of sludge for every individual in the United States. The agency indicated that these figures would double by the year 2000.

The definitions of "sewage sludge" and "sludge" given by Title 40 of the Code of Federal Regulations, Part 257.2 are hereby incorporated herein as follows:

"Sewage sludge means solid, semi-solid, or liquid residue generated during the treatment of domestic sewage in a treatment works. Sewage sludge includes, but is not limited to, domestic septage; scum or solid removed in primary, secondary or advanced wastewater treatment processes; and a material derived from sewage sludge. Sewage sludge does not include ash generated during the firing of sewage sludge in a sewage sludge incinerator or grit and screenings generated during preliminary treatment of domestic sewage in a treatment works.

Sludge means solid, semi-solid, or liquid waste generated from municipal, commercial, or industrial wastewater treatment plant, water supply treatment plant, or air pollution control facility or any other such waste having similar characteristics and effect".

There are several types of sludges that can be produced by sewage or wastewater treatment. These include primary sludge, waste activated sludge, pasteurized sludge, heat-treated sludge, and aerobically or anaerobically digested sludge. The sludges may be municipal or industrial.

Most commonly, sludges are dewatered to the best extent possible by chemical and mechanical means. The water content of sewage sludges is still very high. Typical sludges coming out of a gravity clarifier may have a dry solids content of 2% or less. After anaerobic digestion, the solids content can be about 10%. Cationic water-soluble polymers have been found useful for causing further separation between the solids and the water that is chemically and physically bound. Filtration or centrifugation of cationic polymer treated sludge typically yields a paste-like sludge cake containing about 20% solids Drying of sewage sludge has been practiced for many years in both the United States and Europe. Sludge drying in the United States prior to about 1965 was undertaken to reduce transportation costs and in pursuit of various disposal options. In some plants, the sludge was dried in powder form and the fine particles were consumed in the combustion chamber of an incinerator or boiler In the late 1960's, two municipalities, Houston and Milwaukee, began to market a pelletized or granulated dried sludge for use as a soil amendment and/or fertilizer. Several more plants for manufacture of dried pelletized sludge were built in the 1980's and 1990's; especially after ocean dumping of sludge by coastal cities was eliminated. Drying and conversion to a pelletized fertilizer was the best option for these metropolitan areas where landfills and land for disposal were limited. However, the investment required for a sludge drying facility is large. A typical unit costs about $150 million for equipment alone.

The most common type of sludge dried and pelletized is anaerobically digested municipal sewage. Anaerobic digestion, as the name suggests, involves treatment by facultative bacteria under anaerobic conditions to decompose the organic matter in the sludge. After a prescribed time and temperature, a sludge relatively free of putrifiable organic matter and pathogens is obtained. Municipal anaerobically digested sewage sludge is therefore preferred for agricultural purposes.

However, dry sewage sludge has several disadvantages for agricultural use. It has low fertilization value, typically having nitrogen content of only about 2–5%. Freight and application costs per unit of nitrogen are high. It often has a disagreeable odor, particularly when moist. It has low density and when blended with other commercial fertilizer materials, it may segregate into piles or may not spread on the field uniformly with other more dense ingredients. Bacterial action may continue and under storage conditions sludge temperature may rise to the point of autoignition. Hence, except for special markets that value its organic content for soil amendment or filler in blended fertilizer, there is little demand for the product. In most cases municipalities must pay freight charges, or must offer other incentives for commercial growers to use the material. However, this is frequently still more economical than alternative disposal schemes.

The market value of fertilizers is principally based on their nitrogen content. A need exists for a practical and economic method for increasing the nitrogen content of sewage sludge to a level approaching that of commercial mineral fertilizers, i.e. 10–20%. Freight costs and the cost of application per unit of nitrogen would then be much lower. Overall value and demand would increase. Moreover, sludge has an advantage in that its nitrogen is of the slow release type. The nitrogen is part of organic molecules and hence is available to growing plants only when the molecule is broken down. This is very desirable since it provides nitrogen to the plant all through its growing cycle. Manufactured slow release nitrogen fertilizers have a price nearly 10 times that of ordinary mineral nitrogen fertilizers. Conceivably, municipalities would enjoy a credit rather than an expense in disposing of their dried sludge product if the total nitrogen content can be increased and the tendency for autoignition reduced or eliminated.

Prior art attempts have been made to reach some of these objectives. U.S. Pat. Nos. 3,942,970, 3,655,395, 3,939,280, 4,304,588 and 4,519,831 describe processes for converting sewage sludge to fertilizer. In each of these processes a urea-formaldehyde condensation product is formed in situ with the sludge. However, the processes require the handling of formaldehyde: a highly toxic lachrymator and cancer suspect agent.

French Patent 2,757,504 describes the blending of mineral fertilizers with organic sludge. The mixture is heated to a temperature between 200° C. and 380° C. Japanese Patent 58032638 describes a process where sludge is treated with sulfuric and nitric acids or sulfuric and phosphoric acids and ammonia under elevated pressure of about 3 atmospheres. These prior art processes require costly process equipment and/or special conditions not readily incorporated in existing sewage treatment facilities.

The simplest method of increasing the nitrogen in sludge would be to add commercial nitrogen fertilizer materials to the wet sludge prior to drying and pelletizing. There are only a few high-nitrogen fertilizer materials that are economic for use in agriculture: ammonia (82 wt. % N), urea (37 wt. % N), and ammonium nitrate (35 wt. % N). Ammonia has high volatility and is subject to strict regulation of discharges to the atmosphere. Urea is a solid that adsorbs moisture quite readily and makes the sludge more difficult to dry. It is also highly susceptible to breakdown to ammonia by the microbes and enzymes in sludge, resulting in nitrogen loss and an odor problem. Ammonium nitrate is a strong oxidizer and creates a potential explosion problem. All of these fertilizers have high nitrogen content: but are unsuitable for combining with sludge.

Another possible candidate that has been unsuccessfully tested by the industry as an additive to sludge is ammonium sulfate. Although ammonium sulfate has lower nitrogen content (21 wt % N) than the materials discussed above, it has a price per unit of nitrogen comparable to that of the other commercial fertilizers. It is also relatively inert to the microbes and enzymes in sludge.

Unfortunately, it has been found in full-scale plant trials that a problem occurs during the drying of a mixture of ammonium sulfate and sludge. Title 40 of the Code of Federal Regulations, Part 503, Appendix B specifies that the temperature of the sewage sludge particles must exceed 80° C. or the wet bulb temperature of the gas in contact with the sewage sludge must leave the dryer at a temperature exceeding 80° C. However, when drying a mixture of ammonium sulfate and sludge, a sudden release of ammonia vapors occurs at about 60° C. overwhelming the air pollution control system. Several attempts at addition of ammonium sulfate to sewage sludge in several different plants over several years have foundered on this problem. The discharge of ammonia to the atmosphere is environmentally intolerable. Consequently, ammonium sulfate addition to sewage sludge has not been successful to date.

European Patent 0 143 392 B1 describes a process in which an undigested liquid sludge is mixed with salts such as ammonium sulfate at a concentration of 17–47 wt. % at a pH of 2–6 for a period of 3 to 12 hours followed by disposal. The patent teaches away from drying this mixture. Japanese Patent 9110570 A2 describes the treatment of sewage sludge with an acidic solution followed by drying to reduce ammonia evolution and to retain the effective nitrogen. Honda et al., describe the use of dilute (0.3 Normal) aqueous solutions of HCl, $H_2SO_4$, and wood vinegar as ammonia binders ("Granulation of Compost From Sewage Sludge. V. Reduction of Ammonia Emission From Drying Process", *Hokkaidoritsu Kogyo Shikenjo Hokoku*, 287, 85–89 (1988)). Neither of these latter references discloses the use of acids with ammonium sulfate additions and neither reference discusses the issue of corrosion of steel process equipment under acid conditions.

It will be seen that a long standing need exists for practical means of increasing the economic value of sewage sludge through increasing its nitrogen content, and decreasing its flammability while preventing the release of ammonia during drying and preventing corrosion of the process equipment. The present invention meets those needs in present sewage treatment facilities.

SUMMARY OF THE INVENTION

The present invention is a beneficiated sludge solids composition of increased nitrogen and phosphorus content, and increased economic value comprising digested municipal sewage sludge, ammonium sulfate, mineral acid, and phosphate salt. Preferably, the beneficiated sludge solids composition comprises digested municipal sewage sludge, ammonium sulfate and superphosphoric acid. The method of the invention comprises mixing digested municipal sewage sludge with ammonium sulfate, mineral acid and a phosphate salt followed by drying. Preferably, the method of the invention comprises mixing digested municipal sewage sludge with ammonium sulfate and superphosphoric acid followed by drying. In other embodiments, the method of the invention additionally comprises the step of granulating the beneficiated composition. The method of the invention avoids release of noxious gases, retards corrosion of the treatment equipment, and is practicable in current sewage treatment facilities.

BRIEF DESCRIPTION OF THE DRAWINGS

In the accompanying drawing figures,

FIG. 3 shows the ammonia evolved upon heating sewage sludge—ammonium sulfate mixtures and upon heating examples of the invention.

DETAILED DESCRIPTION OF THE INVENTION

The present invention is a beneficiated sludge solids composition comprising digested municipal sewage sludge, ammonium sulfate, mineral acid and phosphate salt. The constituents of the beneficiated sludge composition of the invention act synergistically to increase economic value through increased fertilization values of nitrogen and phosphorous, decreased flammability and autocombustibility, decreased ammonia evolution and decreased corrosibility on drying. Moreover, the beneficiated sludge composition is capable of being produced in present sewage treatment facilities.

The beneficiated sludge solids composition has a water content of about 0–10 wt. %. Preferably, the beneficiated sludge solids composition is a granulated solid having a water content of about 0–5 wt. %.

In one embodiment, the beneficiated sludge composition is comprised, on a water-free basis, of about 10–77 wt. % digested municipal sewage sludge, about 21–88 wt. % ammonium sulfate, about 1–12 wt. % mineral acid, and about 0.3–6 wt. % phosphate salt.

The digested municipal sewage sludge is aerobically or anaerobically digested. Most preferably, the digested municipal sewage sludge is anaerobically digested. Preferably, the digested municipal sewage sludge constitutes about 25 wt. % to about 75 wt. % of the beneficiated sludge solids composition of the invention on a water-free basis. Most preferably, the digested municipal sewage sludge constitutes about 35 wt. % to about 70 wt % of the beneficiated sludge solids composition of the invention on a water-free basis.

The ammonium sulfate is a commercially available particulate material such as is available from Honeywell International Inc. Preferably the ammonium sulfate has a weight average particle size of 0.03 to 0.60 mm. Preferably the ammonium sulfate is comprised of at least about 95 wt. % $(NH_4)_2SO_4$.

The ammonium sulfate constitutes between about 21 wt. % and about 88 wt. % of the beneficiated sludge solids composition of the invention on a water-free basis. Preferably, the ammonium sulfate constitutes between at about 23 wt. % and about 73 wt % of the beneficiated sludge solids composition on a water-free basis. Most preferably, the ammonium sulfate constitutes between about 28 wt. % and about 63 wt. % of the beneficiated sludge solids composition on a water-free basis.

The mineral acid is preferably at least one member selected from the group consisting of sulfuric acid ($H_2SO_4$), and phosphoric acid ($H_3PO_4$). More preferably, the mineral acid is phosphoric acid. Preferably the mineral acid is a low fluoride acid containing less than about 0.2 wt. % of fluoride.

The mineral acid constitutes between about 1 wt. % and about 12 wt. % of the beneficiated sludge solids composition of the invention on a water-free basis. More preferably, the mineral acid constitutes between about 2.5 wt. % and about 9 wt. % of the beneficiated sludge solids composition of the invention on a water-free basis.

The phosphate salt is at least one member of the group consisting of ammonium metaphosphate ($NH_4PO_3$), ammonium monobasic phosphate ($NH_4H_2PO_4$), ammonium dibasic phosphate (($NH_4)_2HPO_4$), ammonium polyphosphate (($NH_4)_5P_3O_{10}$)), trisodium phosphate ($Na_3PO_4$), tetrasodium pyrophosphate ($Na_4P_2O_7$), sodium tripolyphosphate ($Na_5P_3O_{10}$), hexasodium hexaphosphate ($Na_6P_6O_{18}$), potassium metaphosphate ($KPO_3$), potassium pyrophosphate ($K_4P_2O_7$), potassium monobasic phosphate ($KH_2PO_4$), potassium dibasic phosphate ($KHPO_4$), potassium tribasic phosphate ($K_3PO_4$) and calcium superphosphate ($Ca(H_2PO_4)_2$), Preferably, the phosphate salt is at least one member of the group consisting of trisodium phosphate and sodium tripolyphosphate. Preferably the phosphate salt constitutes between about 0.3 wt. % and about 6 wt. % of the beneficiated sludge composition of the invention on a water-free basis. More preferably, the phosphate salt constitutes between about 0.5 wt. % and about 5 wt. % of the beneficiated sludge solids composition of the invention on a water-free basis.

In a preferred embodiment, the beneficiated sludge solids composition is comprised of about 10–77 wt. % digested municipal sewage sludge, about 20–87 wt. % ammonium sulfate and between about 0.5 and about 12 wt. % superphosphoric acid on a water-free basis. Superphosphoric acid contains about 70 wt. % $P_2O_5$ and 27.3 wt. % polyphosphate. It is available from PCS Sales, Skokie, Ill. under the trade name SUPER-49®. The digested municipal sewage sludge, and ammonium sulfate are as described above.

In one embodiment, the method of the invention comprises the steps of mixing ammonium sulfate, mineral acid and phosphate salt with "dewatered" digested municipal sewage sludge; and drying to a water content of between about 0 wt. % and about 10 wt. % to produce the beneficiated sludge solids composition of the invention. The mineral acid may be incorporated into the sludge composition of the invention as a concentrated acid or as a dilute aqueous solution. Preferably, the mineral acid is incorporated as an aqueous solution of about 75 to about 100 wt. % concentration. The ammonium sulfate and the phosphate salt may be incorporated as aqueous solutions or as solids provided that sufficient mixing time and intensity is provided to uniformly disperse these constituents.

In a preferred embodiment, the method of the invention comprises the steps of mixing ammonium sulfate and superphosphoric acid with "dewatered" digested municipal sewage sludge; and drying to a water content of between about 0 wt. % and about 10 wt. % to produce the beneficiated sludge solids composition of the invention.

In each of the above embodiments, it is preferred that the material charge to the dryer include a recycled portion of the dried beneficiated sludge solids composition. The weight of the recycled portion of the dried beneficiated sludge solids as a ratio to the weight of the "dewatered" sludge solids entering the dryer, on a water free basis, is preferably between about 0.5 and about 10.

In each of the above embodiments, it is most preferred that the dried beneficiated solids composition be dried to a water content of between about 0 wt. % to about 5 wt. % followed by granulation.

Without being held to a particular theory of why the compositions of the invention are effective in reducing ammonia evolution during drying, it believed that the ammonia evolution observed in prior art attempts to incorporate ammonium sulfate in sewage sludge resulted from formation and decomposition of ammonium carbonate. This root cause has not previously been recognized. Ammonium carbonate is known to decompose to ammonia and carbon dioxide at 58° C. Sewage sludge is rich in carbonate because the biological processes used in wastewater and sludge treatment always produce copious quantities of carbon dioxide, a precursor of carbonate. The acidic compositions of the invention cause decomposition of carbonate and evolution of carbon dioxide early in a drying operation so that ammonium carbonate is not present or is minimized when the sludge temperature reaches 58° C. Surprisingly, the acidic beneficiated sludge compositions of the invention may be less corrosive to steel process equipment than the unbeneficiated sludge.

Figure 1A:
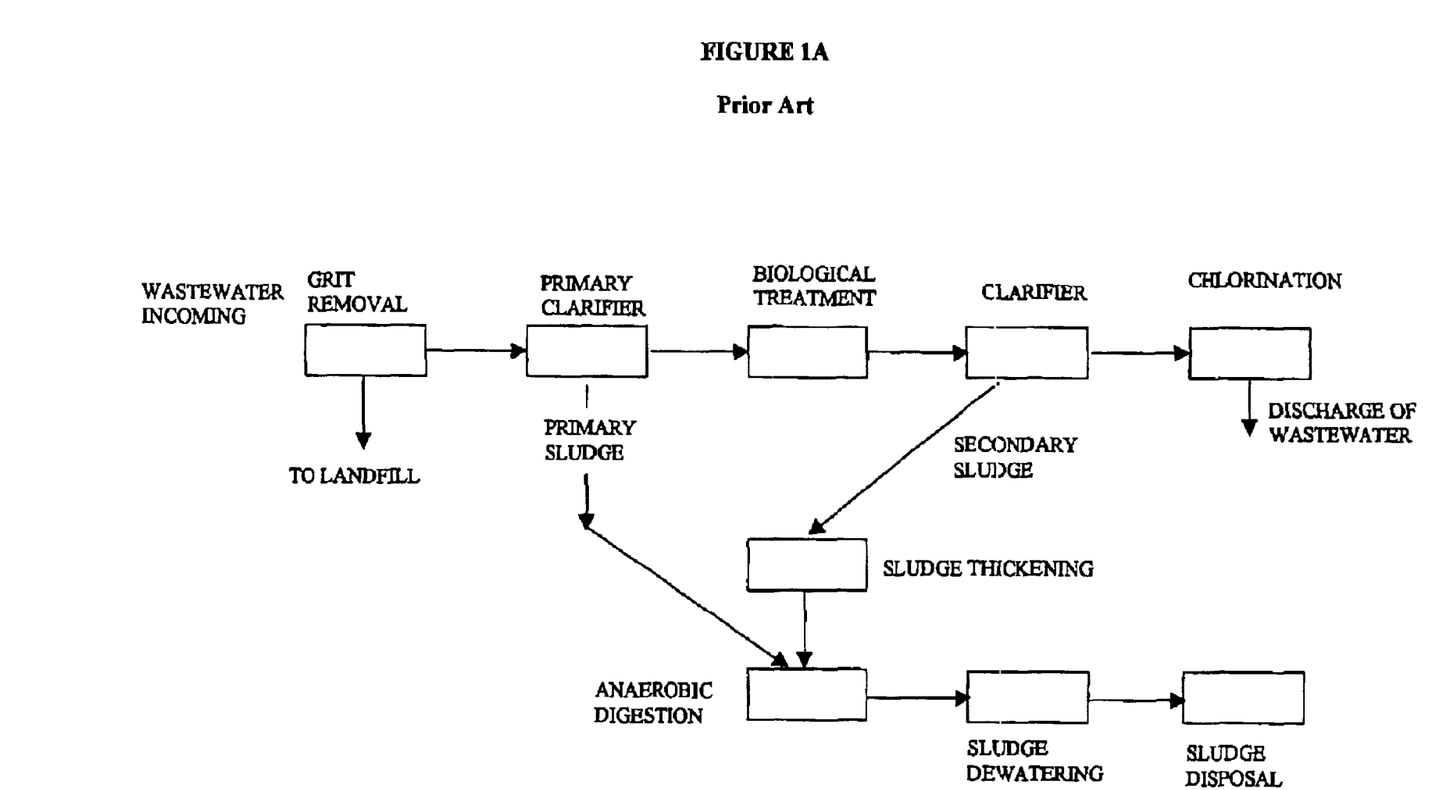
FIG. 1A shows a block diagram for a conventional municipal wastewater treatment process.
Figure 1B:
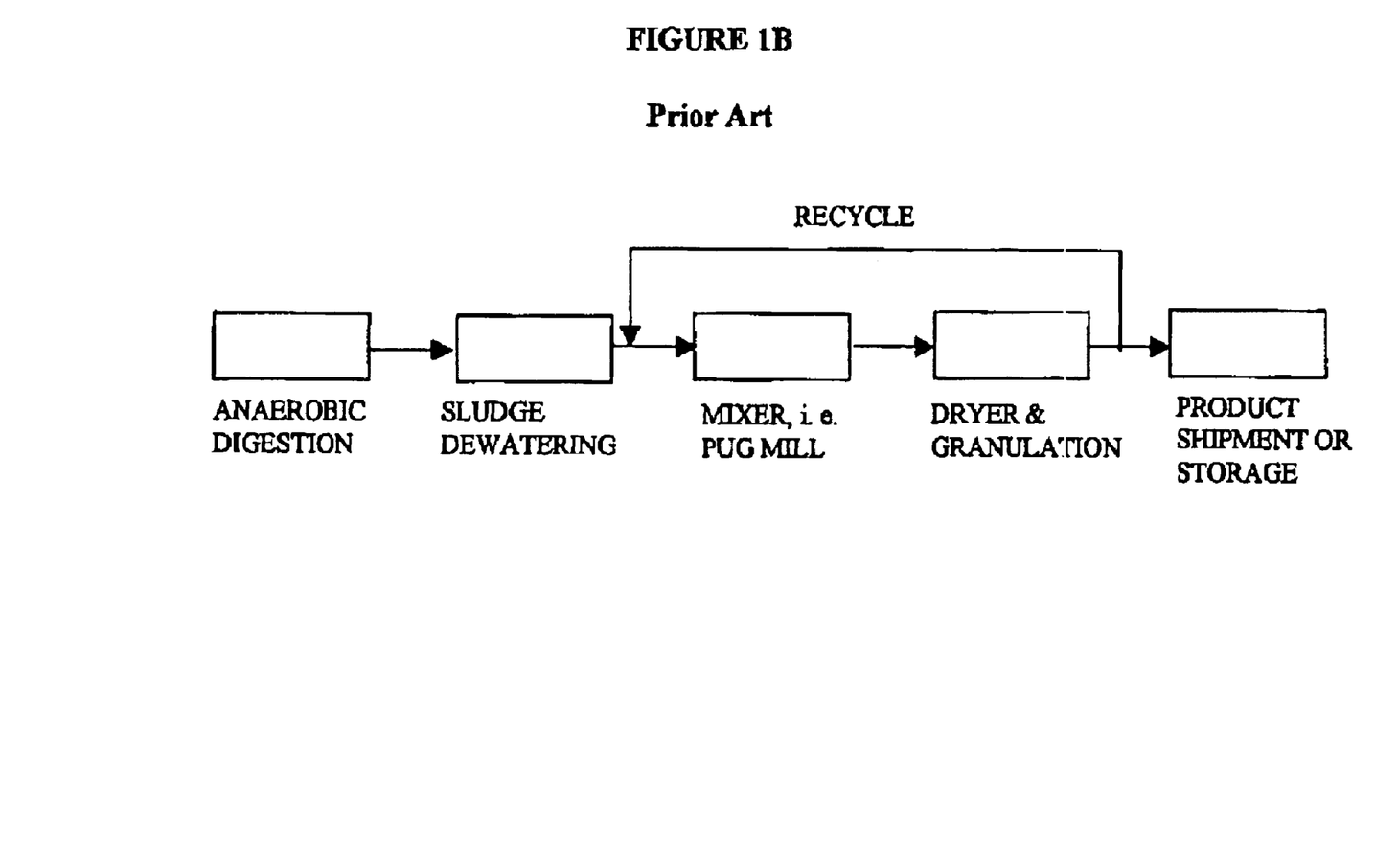
FIG. 1B shows a block diagram for a conventional municipal wastewater treatment process.

FIG. 1 schematically illustrates a typical wastewater treatment process producing an anerobically digested sludge. Sludge disposal may be to landfill, agricultural application, incineration or drying/granualtion. A typical sludge drying/granulation process is shown in the lower portion of FIG. 1. The sludge in the dryer is quickly brought to the highest temperature below the boiling point to enable rapid drying while preventing the formation of easily friable granules. The sludge temperature exiting the dryer may reach 90–110° C.

Figure 2:
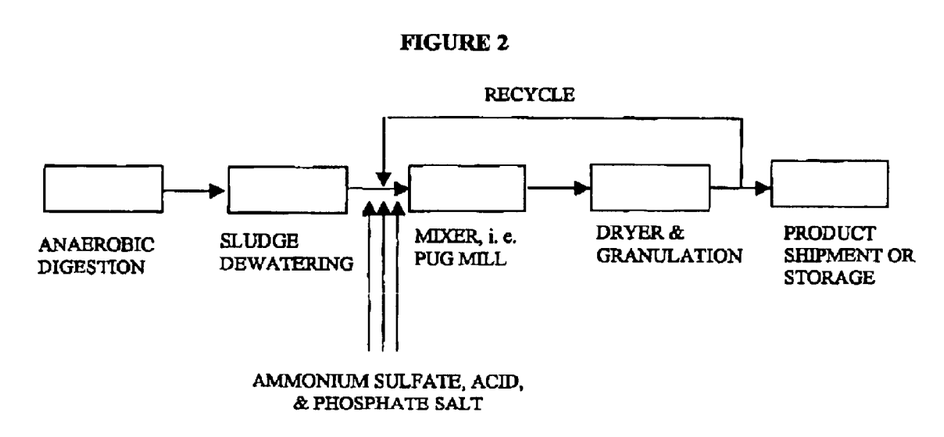
FIG. 2 shows a block diagram for a preferred sludge beneficiating process of the invention.

FIG. 2 schematically illustrates a preferred embodiment of the method of the invention. In FIG. 2, ammonium sulfate, mineral acid and phosphate salt are added to the sludge after dewatering and before or in the mixer. It will be understood that in another preferred embodiment, a superphosphoric acid stream would be shown in FIG. 2 in place of both the mineral acid and the phosphate salt. A significant advantage of the method of the invention is that it is practicable in current wastewater treatment facilities with the minor addition of metering equipment for the additives.

The following examples are presented to provide a more complete understanding of the invention. The specific techniques, conditions, materials, proportions and reported data set forth to illustrate the principles of the invention are exemplary and should not be construed as limiting the scope of the invention.

COMPARATIVE EXAMPLE 1

A 250 ml flask was charged with a mixture of 100 g of "dewatered" anaerobically digested municipal sewage sludge containing 20 wt. % solids on a dry basis and 36 g of ammonium sulfate. The proportions of sewage sludge and ammonium sulfate were 35.7/64.3 by weight on a dry basis. No mineral acid, phosphate salt or superphosphoric acid was added to the mixture.

The sewage sludge was obtained from the City of Richmond, Va. metropolitan wastewater plant. The ammonium sulfate, supplied by Honeywell International, was a particulate material having an average particle size of about 0.25 mm and of 98 wt. % purity.

Attached to one neck of the flask was a nitrogen inlet. The surface of the mixture was swept by nitrogen flow at the rate of 230 cc/min. A glass tube filled with analytical reagents for the measurement of ammonia was attached to the exit of the flask so that all gasses passed through the tube. The tube was manufactured by Dräger Wek AG Lubeck, Germany and was purchased from Fisher Scientific Co. A quantitative reaction occurred between the tube ingredients and ammonia signaled by a color change that progressed down the length of the tube. The Dräger tubes were calibrated with a relationship between the length of the color change and the cumulative parts per million (ppm) of ammonia absorbed from the nitrogen stream. Dräger tubes with a capacity of 30 ppm were used. When a tube was saturated, a fresh tube was inserted.

The flask containing the mixture was placed in a water bath at about 21° C. and the temperature of the water was gradually increased at the rate of about 1° C./min up to a maximum of about 70° C.

Evolution of ammonia from the mixture was evident immediately. The rate of evolution increased slowly until the temperature reached about 58° C. as shown in Table 1 below and in FIG. 3. The ammonia evolution then increased rapidly.

COMPARATIVE EXAMPLE 2

A second experiment similar to Comparative Example 1 was conducted except that 10 g of 1N sulfuric acid was mixed with the sludge-sulfate mixture. The amount of acid on a 100% basis was 0.49 g or 0.87 wt. % of the dry weight of the mixture. This was about double that expected to neutralize all of the alkalinity. The data for Comparative Example 2 are shown in Table 1 and FIG. 3.

TABLE I

| Comparative Example 1 | | Comparative Example 2 | |
| --- | --- | --- | --- |
| Temp., ° C. | Ammonia Evolution, ppm | Temp., ° C. | Ammonia Evolution, ppm |
| 25 | 2 | 21 | 0 |
| 29 | 8 | 22 | 2 |
| 36 | 14 | 28 | 5 |
| 47 | 20 | 40 | 10 |
| 54 | 30 | 47 | 15 |
| 57 | 34 | 52 | 20 |
| 58 | 37 | 55 | 25 |
| 59 | 44 | 57 | 30 |

TABLE I-continued

| Comparative Example 1 | | Comparative Example 2 | |
| --- | --- | --- | --- |
| Temp., ° C. | Ammonia Evolution, ppm | Temp., ° C. | Ammonia Evolution, ppm |
| 61 | 49 | 58 | 35 |
| 65 | 59 | 59 | 40 |
| 66 | 59 | 60 | 45 |
| 66 | 69 | 61 | 50 |
| 66 | 74 | 62 | 55 |
| 68 | 89 | 63 | 60 |
| 70 | 94 | 63 | 65 |
| 71 | 104 | 64 | 70 |
| | | 65 | 75 |
| | | 65 | 80 |
| | | 66 | 85 |
| | | 66 | 90 |
| | | 67 | 95 |
| | | 69 | 100 |

Comparative Examples 1 and 2 illustrate the problem of rapid evolution of ammonia from a mixture consisting of ammonium sulfate and sewage sludge upon heating

Examples 3–6

Forty gram portions of the same sewage sludge (20 wt. % solids) described in Comparative Example 1 were mixed with 15 g of the ammonium sulfate described in Comparative Example 1, 0.22 g of sodium tripolyphosphate ($Na_5P_3O_{10}$), and varying amounts of sulfuric acid and phosphoric acid as indicated in Table II. The flasks containing the mixtures were placed in a water bath and the temperature was raised slowly at a rate of about 1°/minute up to a maximum of 70° C. The nitrogen purge gas rate was 230 cc/min. The temperature, and the ammonia evolution indicated by the Dräger tube were recorded periodically. The percentage composition of the mixtures (dry weight basis), and ammonia evolution are shown in Table II and FIG. 3.

TABLE II

| | Wt. %, water-free basis | | | | | NH3 |
| --- | --- | --- | --- | --- | --- | --- |
| Ex. No. | Sewage sludge | Ammonium sulfate | Acid | $Na_5P_3O_{10}$ | Temp., ° C. | Evolution, ppm |
| 3 | 33.6 | 63.0 | 2.5 S* | 0.9 | 40 | 0 |
| | | | | | 60 | 2 |
| | | | | | 70 | 3 |
| 4 | 33.3 | 62.4 | 3.3 S* | 0.9 | 40 | 0 |
| | | | | | 51 | 5 |
| | | | | | 70 | 5 |
| 5 | 33.3 | 62.4 | 3.3 P* | 0.9 | 40 | 0 |
| | | | | | 51 | 5 |
| | | | | | 68 | 20 |
| | | | | | 70 | 22 |
| 6 | 33.0 | 61.9 | 4.1 P* | 0.9 | 40 | 0 |
| | | | | | 66 | 1 |
| | | | | | 67 | 2 |
| | | | | | 69 | 5 |
| | | | | | 70 | 8 |

*S = Sulfuric Acid; P = Phosphoric Acid

It is seen from Table II and FIG. 3 that ammonia evolution form a mixture of sewage sludge, ammonium sulfate and sodium tripolyphosphate was heavily suppressed when the mixture additionally contained 2.5 wt. % of mineral acid on a dry basis. Recognizing that ammonia is normally evolved during the drying of sewage sludge and that existing pollution control equipment is able to handle the normal ammonia load, it is sufficient that the beneficiated sewage sludge compositions of the invention contain at least about 1 wt. % of mineral acid on a dry basis.

Example 7

Forty grams of the same sewage sludge (20 wt. % solids) described in Comparative Example 1 were mixed with 3 g of the ammonium sulfate described in Comparative Example 1, and 0.12 g of superphosphoric acid containing about 70 wt. % $P_2O_5$ and 27.3 wt. % polyphosphate available from PCS Sales, Skokie, IL. under the trade name SUPER-49®. This beneficiated sludge mixture was dried at 105° C. and granulated to pass a Tyler #20 sieve. The dried granulated solids were recycled and mixed with an additional 10 g of the same initial sewage sludge (20 wt. % solids), 3 g of the same ammonium sulfate and 0.12 g of the same superphosphoric acid. This final mixture contained on a water-free basis, 64.6 wt. % sewage sludge, 33.5 wt. % ammonium sulfate and 1.9 wt. % superphosphoric acid.

The final mixture was charged to a large test tube purged with nitrogen at a flow rate of 250 cc/min. A 30 ppm Dräger tube was attached to the nitrogen outlet. The tube containing the mixture was immersed in a water bath at 40° C. and heated at the rate of about 2° C./min to 69° C. The ammonia evolution measurements are shown in Table III and FIG. 3.

TABLE III

| Example No. | Temperature, ° C. | Ammonia Evolution, ppm |
|---|---|---|
| 7 | 45 | 2 |
|   | 60 | 5 |
|   | 69 | 10 |

It is seen from Table III and FIG. 3 that ammonia evolution from a mixture of sewage sludge and ammonium sulfate was heavily suppressed when the mixture additionally contained 1.9 wt. % of superphosphoric acid on a dry basis. Recognizing that ammonia is normally evolved during the drying of sewage sludge and that existing pollution control equipment is able to handle the normal ammonia load, it is sufficient that the beneficiated sewage sludge compositions of the invention contain at least about 1 wt. % of superphosphoric acid on a dry basis.

Examples 8–17

A drying and granulation process with recycle to simulate the operation of a plant production process is described in these examples of the invention. Beneficiated mixtures are prepared of "dewatered" sewage sludge (20 wt. % solids), ammonium sulfate, mineral acid and sodium tripolyphosphate having the compositions shown in Table IV. The sewage sludge and the ammonium sulfate are as described in Comparative Example 1. A portion of each beneficiated sludge mixture is set aside and a portion is dried at 105° C. The dried beneficiated sludge solids are ground to pass a Tyler #20 sieve and then recycled and mixed with portions of the beneficiated sludge mixtures of the same composition previously set aside. These final mixtures are dried to a moisture content less than 5 wt. % and granulated to produce the granulated beneficiated sewage solids compositions of the invention. The recycle ratio, defined as the ratio of the weight of the recycled dried beneficiated sludge solids to the weight of the "dewatered" sludge solids entering the dryer is shown in Table IV.

TABLE IV

| | Weight %, dry basis | | | | |
|---|---|---|---|---|---|
| Ex. No. | Dewatered sewage sludge | Ammonium sulfate | Acid | $Na_5P_3O_{10}$ | Recycle Ratio |
| 8 | 10 | 86 | 2.5 S* | 1.5 | 10 |
| 9 | 30 | 66 | 2.5 S* | 1.5 | 8 |
| 10 | 50 | 46 | 2.5 S* | 1.5 | 6 |
| 11 | 10 | 26 | 2.5 S* | 1.5 | 4 |
| 12 | 85 | 11 | 2.5 S* | 1.5 | 0.5 |
| 13 | 10 | 86 | 2.5 P* | 1.5 | 10 |
| 14 | 30 | 66 | 2.5 P* | 1.5 | 8 |
| 15 | 50 | 46 | 2.5 P* | 1.5 | 6 |
| 16 | 70 | 26 | 2.5 P* | 1.5 | 4 |
| 17 | 85 | 11 | 2.5 P* | 1.5 | 0.5 |

*S = sulfuric acid; P = phosphoric acid

Comparative Examples 18–23 and Examples 24–28

The objective of this experiment was to determine the corrosion rates of mild carbon steel immersed in "dewatered" sewage sludge and in sludge mixtures containing ammonium sulfate, mineral acid and different phosphate salts. The sludge in each case was the same City of Richmond sewage sludge containing 20 wt. % solids described in Comparative Example 1 and the ammonium sulfate was the same material described in Comparative Example 1.

Steel coupons (C-1020), obtained from Metal Samples, Munford, Ala., were placed in 125 ml screw top bottles and sufficient sludge or sludge mixture was added to cover each coupon to a depth of about 12 mm inch above its top. The square bottles had a width less than the length of the coupons hence the coupons were in a leaning position with only two edges in contact with the glass. This insured good exposure of the metal surface. The coupons weighed about 22 grams and were 51 mm long by 19.4 mm wide and 3 mm inch thick. The bottles were then placed in an oven at 90° C. for 5 days. It was necessary to retighten the caps after the bottles reached temperature. The coupons were weighed to the nearest $1/10^{th}$ mg prior to contact with sludge and at the conclusion of the test. Upon removal from the sludge, the coupons were brushed with a stiff brush and rinsed in a stream of tap water followed by brushing in soapy water. The coupons were rinsed with water and acetone and dried. Next, abrasion of the surface was done to remove scale and other adhering deposits. This was accomplished by means of a motorized eraser such as commonly used in engineering drafting/drawing offices. This was followed by rinsing with acetone, drying, and weighing. Equivalent thickness loss due to corrosion was calculated from the weight loss and reported as mm/year in Table V.

TABLE V

| Ex. No. | Phosphate Salt in Mixture | Wt. %, water-free basis | | | | Steel Corrosion Loss, mm/yr |
|---|---|---|---|---|---|---|
| | | Sewage Sludge | Ammonium Sulfate | Phosphoric Acid | Phosphate Salt | |
| 18 (Comp.) | None | 100 | 0 | 0 | 0 | 0.16 |
| 19 (Comp.) | None | 100 | 0 | 0 | 0 | 0.19 |
| 20 (Comp.) | None | 41.5 | 58.5 | 0 | 0 | 0.16 |
| 21 (Comp.) | None | 41.5 | 58.5 | 0 | 0 | 0.17 |
| 22 (Comp.) | None | 41.5 | 58.5 | 0 | 0 | 0.17 |
| 23 (Comp.) | None | 41.5 | 58.5 | 8.1 | 0 | 0.73 |
| 24 | $Na_5P_3O_{10}$ | 37.5 | 54.0 | 8.07 | 0.43 | 0.55 |
| 25 | $Na_5P_3O_{10}$ | 37.4 | 53.8 | 8.0 | 0.85 | 0.15 |
| 26 | $Na_5P_3O_{10}$ | 63.1 | 35.2 | 1.21S* | 0.55 | 0.13 |
| 27 | $Na_5P_3O_{10}$ | 70.0 | 25.4 | 3.02 S* | 1.75 | 0.38 |
| 28 | $Na_3PO_4$ | 34.8 | 62.6 | 2.25 | 0.34 | 0.05 |

*S = sulfuric acid instead of phosphoric acid

In comparison to sludge alone, steel corrosion is much more severe in mixtures containing sludge, ammonium sulfate and mineral acid (Comparative Example 23 vs. Comparative Example 18 or 19). However, when a soluble phosphate salt is also present in a concentration exceeding about 0.3 wt. %, steel corrosion with the beneficiated sludge composition is comparable to, or may be less, than corrosion with sludge alone. Steel corrosion may be greater when the beneficiated composition contains sulfuric acid, but it is within tolerable limits.

Examples 29–40

Additional corrosion tests are carried out in a manner identical to described above but using the alternative phosphate salts shown in Table VI.

TABLE VI

| Ex. No. | Phosphate Salt in Mixture | Wt. %, water-free basis | | | | Steel Corrosion Loss, mm/yr |
|---|---|---|---|---|---|---|
| | | Sewage Sludge | Ammonium Sulfate | Phosphoric Acid | Phosphate Salt | |
| 29 | $NH_4PO_3$ | 37 | 55 | 5 | 3 | <0.2 |
| 30 | $NH_4H_2PO_4$ | 37 | 54 | 5 | 4 | <0.2 |
| 31 | $(NH_4)_2HPO_4$ | 37 | 53 | 5 | 5 | <0.2 |
| 32 | $(NH_4)_5P_3O_{10}$ | 37 | 52 | 5 | 6 | <0.2 |
| 33 | $Na_4P_2O_7$ | 37 | 56 | 5 | 2 | <0.2 |
| 34 | $Na_6P_6O_{18}$ | 37 | 55 | 5 | 3 | <0.2 |
| 35 | $KPO_3$ | 37 | 54 | 5 | 4 | <0.2 |
| 36 | $K_4P_2O_7$ | 37 | 56 | 5 | 2 | <0.2 |
| 37 | $KH_2PO_4$ | 37 | 54 | 5 | 4 | <0.2 |
| 38 | $KHPO_4$ | 37 | 55 | 5 | 3 | <0.2 |
| 39 | $K_3PO_4$ | 37 | 56 | 2 | 2 | <0.2 |
| 40 | $Ca(H_2PO_4)_2$ | 37 | 53 | 5 | 5 | <0.2 |

Examples 41–42

A preferred embodiment of the beneficiated sludge solids of the invention is comprised of digested municipal sewage sludge, ammonium sulfate, and superphosphoric acid (70 wt. % $P_2O_5$ and 27.3 wt. % polyphosphate). Corrosion tests were carried out for the beneficiated sludge compositions shown in Table VI in a manner identical to that described above. The superphosphoric acid was obtained from PCS Sales, Skokie, Ill. under the trade name Super-49®.

TABLE VII

| Ex. No. | Wt. %, dry basis | | | Steel Corrosion Loss, mm/yr |
|---|---|---|---|---|
| | Sewage Sludge | Ammonium Sulfate | Super Phosphoric Acid | |
| 41 | 44.2 | 55.2 | 0.6 | 0.17 |
| 42 | 44.1 | 55.1 | 0.8 | 0.19 |

Comparison of Examples 41–42 with Comparative Examples 18–19 shows that steel corrosion in contact with these compositions of the invention is comparable to that with sludge alone.

Comparative Example 43 and Examples 44–45

Pelletized dried sludge has been known to auto combust and cause destruction of warehouses and storage facilities. Auto combustion results from continued bacterial action on the sludge organic matter and consequent heat generation and temperature rise. The rising temperature accelerates the bacterial action. In the absence of good heat dissipation, the sludge may begin to oxidize, experience thermal runaway, and ignite. The following experiment compared bacterial growth in sewage sludge and in beneficiated compositions of the invention.

Anaerobically digested sewage sludge (20% solids) from the City of Richmond Wastewater Treatment Plant was dried overnight at 105° C. Two beneficiated sludge solids compositions of the invention were prepared from the same sewage sludge and were also dried overnight at 105° C. The beneficiated sludge solids compositions, on a dry basis, were: 41.0 wt. % sewage sludge, 55.8 wt. % ammonium sulfate, 2.0 wt. % sodium tripolyphosphate and 1.2 wt. % mineral acid. The mineral acid was sulfuric acid in one of the beneficiated sludge solids compositions and phosphoric acid in the other. In Table VIII below, these beneficiated sludge solids compositions are designated as "Beneficiated—Sulfuric", and "Beneficiated—Phosphoric" respectively. Each of the three dried materials was broken into particles of about 3 mm dimension weighing about 0.02 g.

Four sterile 47 mm cloth pads were soaked with "Total Count Media With Indicator" (Millipore Catalog # M00P2TT) and placed in open sterile Petri dishes. Three particles of each of the three dried sludge solids compositions were placed on each of three of the media soaked pads. One cloth pad was not contacted with a sludge sample as a blank control. The three sample Petri dishes and the fourth blank Petri dish were sealed and incubated for 2 days at 36.7° C.

After incubation, two sludge particles and the 10×10 mm sections of the cloth pad immediately surrounding them were removed from the Petri dishes. A particle together with its section of pad was placed in 100 mm of sterile water and homogenized with a Silverson L4R homogenizer with a ¾ inch (19.05 mm) Tubular Disintegrating Head. Sections of the blank cloth pad were similarly homogenized. The homogenized materials were centrifuged at 1150 RPM in a Universal Centriguge using sterile glass tubes of about 40 mm diameter and 180 mm length. Following centrifugation, 5 ml of each clear supernatant liquid was passed through a pre-sterilized Analytical Test Filter Funnel (Nalgene catalog #145-0045) using a 0.45 micron membrane filter of 47 mm diameter with grid markings.

The faces of the membrane filters were place in contact with a second set of media soaked sterile cloth pads and incubated in sealed Petri dishes for 1 day at 36.7° C. The media and pads were as described above. At the end of this time, the membranes were examined and the number of bacterial colonies forming dark round colonies on their faces were counted. The results are shown in Table VIII.

TABLE VIII

| Ex. No. | Sludge Solids Composition | Bacterial Colony Count | |
|---|---|---|---|
| 43(Comp.) | Municipal Anerobically Digested | >1000 | 800 |
| 44 | Beneficiated - Sulfuric | 30 | 100 |
| 45 | Beneficiated - Phosphoric | 30 | 10 |
|  | None - Blank | 0 | 0 |

It is seen that bacterial growth in the sludge solids compositions of the invention was severely inhibited.

Comparative Examples 46–47 and Examples 48–52

The problem of auto combustibility of dried sewage sludge noted above has two critical root causes: continued bacterial growth and flammability of the sludge. The ability of dried sewage sludge and several beneficiated compositions of the invention to support combustion were compared in the following experiment.

Anaerobically digested sewage sludge (20% solids) from the City of Richmond Wastewater Treatment Plant was placed in an oven in a thin layer and dried at 105° C. overnight. Five beneficiated compositions of the invention shown in Table VIII containing differing amounts of sewage sludge, ammonium sulfate, 85% reagent grade phosphoric acid, and sodium tripolyphosphate were also dried in a similar manner. All dried materials were granulated with a mortar and pestle and screened so that the samples passed a Tyler #16 sieve (1 mm opening) and were retained on a Tyler #32 screen (0.5 mm opening).

A Tyler #32 stainless steel wire screen of 112 mm width by 290 mm length was bent along the midline of its width into a V-shaped trough of about 90° included angle having a depth of about 75 mm. The V-shaped trough was clamped in a horizontal plane with the apex of the V at the bottom and the opening of the V facing up.

Two 20 g quantities of dried and granulated materials were placed in separate sample piles along the length of the trough. One of these sample piles was a beneficiated composition of the invention. The other sample pile was an unbeneficiated dried sewage sludge control. The sample piles were separated from one another by at least 75 mm. An individual sample pile was heated from beneath at its center by the flame of a BernzOmatic® Pencil Flame Jet Torch (propane fuel). After heating for a period of 20 seconds, the propane torch was withdrawn and the continued appearance of flames or lack thereof was noted. The second sample in the trough was then similarly tested. The sample compositions and the observations are presented in Table IX. In some cases the compositions do not total 100% because of rounding.

TABLE IX

| | Wt. %, dry basis | | | | |
|---|---|---|---|---|---|
| Ex. No. | Sewage sludge | Ammonium sulfate | $H_3PO_4$ | $Na_5P_3O_{10}$ | Continued Flaming |
| 46 (Comp.) | 100 | 0 | 0 | 0 | Yes - about 5 seconds |
| 47 (Comp.) | 78 | 19 | 1.9 | 0.9 | Yes - about 2 seconds |
| 48 | 65 | 33 | 1.6 | 0.7 | No |
| 49 | 49 | 49 | 1.2 | 0.6 | No |
| 50 | 47 | 50 | 2.5 | 0.5 | No |
| 51 | 39 | 59 | 1.0 | 0.4 | No |
| 52 | 30 | 68 | 0.8 | 0.3 | No |

It will be seen that the dried sewage sludge and the mixture containing 19 wt. % ammonium sulfate both continued to flame after withdrawal of the propane torch while compositions of the invention containing more than about 19 wt. % ammonium sulfate immediately self extinguished.

What is claimed is:

1. A beneficiated sludge solids composition characterized by its ability to reduce ammonia emissions, the composition consisting essentially of:

digested municipal sewage sludge containing carbonate or carbon dioxide;

ammonium sulfate;

mineral acid; and phosphate salt;

wherein the acid causes decomposition of the carbonate or carbon dioxide so that ammonia emissions are minimized.

2. The beneficiated sludge solids composition of claim 1, comprising on a water-free basis: about 10 wt. % to about 77 wt. % of said digested municipal sewage sludge; about 21 wt. % to about 88 wt. % of said ammonium sulfate; about 1 wt. % to about 12 wt. % of said mineral acid; and about 0.3 wt. % to about 6 wt. % of said phosphate salt.

3. The beneficiated sludge solids composition of claim 1, comprising on a water-free basis: about 25 wt. % to about 75 wt. % of said digested municipal sewage sludge; about 23 wt. % to about 73 wt. % of said ammonium sulfate; about 2.5 wt. % to about 9 wt. % of said mineral acid; and about 0.5 wt. % to about 5 wt. % of said phosphate salt.

4. The beneficiated sludge solids composition of claim 1, comprising on a water-free basis: about 35 wt. % to about 70 wt. % of said digested municipal sewage sludge; about 28 wt. % to about 63 wt. % of said ammonium sulfate; about 2.5 wt. % to about 9 wt. % of said mineral acid; and about 0.5 wt. % to about 5 wt. % of said phosphate salt.

5. The beneficiated sludge solids composition of claim 1, wherein the digested municipal sewage sludge is anaerobically digested.

6. The beneficiated sludge solids composition of claim 1, wherein the mineral acid is at least one member selected from the group consisting of sulfuric acid and phosphoric acid.

7. The beneficiated sludge solids composition of claim 1, wherein the phosphate salt is at least one member selected from the group consisting of ammonium metaphosphate ($NH_4PO_3$), ammonium monobasic phosphate ($NH_4H_2PO_4$), ammonium dibasic phosphate (($NH_4)_2HPO_4$), ammonium polyphosphate (($NH_4)_5P_3O_{10}$)), trisodium phosphate ($Na_3PO_4$), tetrasodium pyrophosphate ($Na_4P_2O_7$), sodium tripolyphosphate ($Na_5P_3O_{10}$), hexasodium hexaphosphate ($Na_6P_6O_{18}$), potassium metaphosphate ($KPO_3$), potassium pyrophosphate ($K_4P_2O_7$), potassium monobasic phosphate ($KH_2PO_4$), potassium dibasic phosphate ($KHPO_4$), potassium tribasic phosphate ($K_3PO_4$) and calcium superphosphate ($Ca(H_2PO_4)_2$).

8. The beneficiated sludge solids composition of claim 1, wherein the phosphate salt is at least one member selected from the group consisting of trisodium phosphate and sodium tripolyphosphate.

9. The beneficiated sludge solids composition of claim 1, having a water content of between about 0 wt. % to about 10 wt. %.

10. The beneficiated sludge solids composition of claim 1, having a water content of between about 0 wt. % to about 5 wt. %.

11. The beneficiated sludge solids composition of claim 10 in granulated form.

12. A beneficiated sludge solids composition characterized by its ability to reduce ammonia emissions, the composition comprising:
   digested municipal sewage sludge containing carbonate or carbon dioxide;
   ammonium sulfate;
   mineral acid; and
   phosphate salt, wherein the salt is selected from the group of trisodium phosphate or sodium tripolyphosphate;
   wherein the acid causes decomposition of the carbonate or carbon dioxide so that ammonia emissions are minimized.

13. The beneficiated sludge solids composition of claim 12, comprising on a water-free basis: about 10 wt. % to about 77 wt. % of said digested municipal sewage sludge; about 21 wt. % to about 88 wt. % of said ammonium sulfate; about 1 wt. % to about 12 wt. % of said mineral acid; and about 0.3 wt. % to about 6 wt. % of said phosphate salt.

14. The beneficiated sludge solids composition of claim 12, comprising on a water-free basis: about 25 wt. % to about 75 wt. % of said digested municipal sewage sludge; about 23 wt. % to about 73 wt. % of said ammonium sulfate; about 2.5 wt. % to about 9 wt. % of said mineral acid; and about 0.5 wt. % to about 5 wt. % of said phosphate salt.

15. The beneficiated sludge solids composition of claim 12, comprising on a water-free basis: about 35 wt. % to about 70 wt. % of said digested municipal sewage sludge; about 28 wt. % to about 63 wt. % of said ammonium sulfate; about 2.5 wt. % to about 9 wt. % of said mineral acid; and about 0.5 wt. % to about 5 wt. % of said phosphate salt.

16. The beneficiated sludge solids composition of claim 12, wherein the digested municipal sewage sludge is anaerobically digested.

17. The beneficiated sludge solids composition of claim 12, wherein the mineral acid is at least one member selected from the group consisting of sulfuric acid and phosphoric acid.

18. The beneficiated sludge solids composition of claim 12, having a water content of between about 0 wt. % to about 10 wt %.

19. The beneficiated sludge solids composition of claim 18, having a water content of between about 0 wt. % to about 5 wt. %.

* * * * *